No. 867,619. PATENTED OCT. 8, 1907.
F. STRNAD.
SELF ACTING VALVE FOR COMPRESSORS AND THE LIKE.
APPLICATION FILED MAR. 29, 1906.

Witnesses:

Inventor
Ferdinand Strnad

UNITED STATES PATENT OFFICE.

FERDINAND STRNAD, OF SCHMARGENDORF, GERMANY.

SELF-ACTING VALVE FOR COMPRESSORS AND THE LIKE.

No. 867,619.  Specification of Letters Patent.  Patented Oct. 8, 1907.

Application filed March 29, 1906. Serial No. 308,763.

*To all whom it may concern:*

Be it known that I, FERDINAND STRNAD, a subject of the Austrian Emperor, residence 8 Sulzaerstrasse, Schmargendorf, near Berlin, Germany, have invented certain new and useful Improvements in Self-Acting Valves for Compressors and the Like, of which the following is a specification.

The present invention relates to improvements in self-acting valve for compressors, and the like which allow of a long stroke of the valves, even when the machine is running with a high speed or shows the highest number of revolutions and which nevertheless can be brought to the seat in a completely silent manner and are lifted therefrom without over-pressure *i. e.* in a relieved manner. For this purpose I use a very light pre-closing valve and a suitable buffer or cushioning device for a silent closure, whereby pressure is accumulated, in order to relieve the valve for the following lift, and I further combine with the buffer device one or more relief valves which give free access to the elastic fluid when the valve is being lifted.

On the accompanying drawing I have shown the invention.

Figure 1:
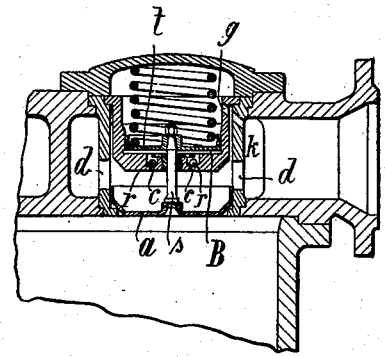
Figure 2:
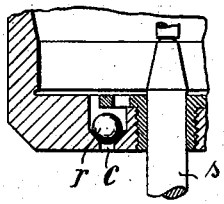
Figure 3:
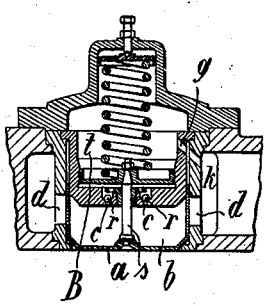

Figure 1 is a vertical sectional view of a valve corresponding to my said invention, in the form of a pressure valve of a compressor, blower, vacuum pump or the like. Fig. 2 is a similar view of the buffer device on a larger scale. Fig. 3 is a vertical sectional view of a modification of Fig. 1.

The valve $a$ the weight of which should be as small as possible is turned up on its edge and prevents the elastic fluid from flowing back from the pressure space $k$, when approaching its closing position, as soon as the ports $d$ have been closed.

With the valve $a$ a buffer plate $t$ is rigidly connected by means of the spindle $s$ which buffer plate $t$, simultaneously with the beginning of the pre-closure, enters the narrow bore of the valve chamber and compresses the elastic-fluid. When the piston has reached its dead point in the cylinder, the pre-closing of the valve begins, whereupon the latter continues its movement during the return stroke of the piston. As the pressure in the cylinder quickly diminishes, until it reaches the suction-tension, the whole difference of the pressure between this tension and the tension in the chamber $k$ is available for compressing in the buffer-chamber B the elastic fluid to such a degree that not only the valve is silently closed upon its seat, but also an excess of pressure is accumulated sufficient for relieving the valve at its next lift; consequently the lifting of the valve takes place quickly and at the right moment, when the elastic fluid is sufficiently compressed in the cylinder. The relief valves $r$ in the cylinder open automatically, so that the elastic fluid may freely enter the space B. By means of the bore $g$ the pressure over the plate $t$ and in the space $k$ is equalized.

In the modified form shown in Fig. 3 the effect of the pressure buffer just described is increased by the addition of a suction buffer $b$ which works simultaneously with the pressure buffer. The cylindrical part of the valve $a$ is somewhat higher, so that it forms a space or chamber $b$ above the valve. Upon the valve $a$ and the buffer plate $t$ rigidly connected thereto being lifted, the elastic fluid lifts the relief valves $r$ and is forced from the buffer space $b$ through the bores $c$ to the buffer space B and thence flows through the bore $g$ to the pressure space $k$ as soon as the buffer plate $t$ has left the narrow bore of the valve chamber. When the valve returns to its seat the pressure buffer B acts in the same manner as above described, while in space $b$ an under-pressure is formed, because the elastic fluid is prevented by means of the relief valves $r$ from passing to the space $b$.

I am aware that it is known to use compressor valves with buffers. But valves of this kind are useless without a pre-closing device, because the closing takes place slowly (or creepingly) under constant back-flow of the elastic fluid to the cylinder and whereby the suction to the cylinder is prevented. Moreover there are no relief valves and consequently the re-openings of the valve takes place with a considerable over-pressure thereon. The well known liquid buffers are not suited for increasing the tension for the following lifting of the valve, because liquids are uncompressible. It has also been proposed to arrange the buffers outside the valve chamber; but the stuffing box necessary in this case makes the working of self-acting valves of this kind unreliable, especially when the machine runs with high speed. With valve gears of steam engines buffers arranged inside the valve chamber have already been proposed, but the lifting of the valve of the same is effected by the gear itself, so that relief valves are unnecessary.

Having now particularly described and ascertained the nature of my said invention and in what manner the same is to be performed I declare that what I claim is:

1. In compressors and the like, the combination with a cylinder open at both ends and flushing at one end with the inside of the working cylinder and provided in its wall with discharge-apertures, of a disk-valve seated in said cylinder and provided round its periphery with a cylindrical projection which is guided in said cylinder and is adapted to uncover the discharge apertures in the latter, a cap closing the other end of said cylinder and extending through same so as to leave an annular narrow space for the cylindrical extension of said disk-valve and a chamber for the play of the latter, said cap having a central hole and being bored to form a cylinder, a cushioning piston reciprocating in the cylindrical bore of said cap, a stem passing through the central hole of said cap and rigidly connecting said disk-valve with said piston, a spring disposed in the working cylinder and adapted to force said piston towards the bottom of said cap, and relieving means in said cap and adapted to open towards said piston under the pressure of the fluid within the chamber between said disk-valve and said cap.

2. In compressors and the like, the combination with a cylinder open at both ends and flushing at one end with the inside of the working cylinder and provided in its wall with discharge-apertures, of a disk-valve seated in said cylinder and provided round its periphery with a cylindrical projection which is guided in said cylinder and is adapted to uncover its discharge-apertures upon the lifting of the valve, a cap closing the other end of said cylinder and extending through same so as to leave an annular narrow space for the cylindrical extension of said disk-valve and a chamber for the play of the latter, said cap having a central hole and being bored to form a cylinder, a cushioning piston reciprocating in the cylindrical bore of said cap, a stem passing through the central hole of said cap and rigidly connecting said disk-valve with said piston, a spring disposed in the working cylinder and adapted to force said piston towards the bottom of said cap, and relief-valves in said cap and adapted to open towards said piston under the pressure of the fluid within the chamber between said disk-valve and said cap, said cushioning piston serving for rendering silent the closure of said disk-valve, and said relief-valves serving for rendering silent the opening of said disk-valve and allowing of an ample stroke of the latter.

In testimony whereof I have hereunto set my hand in presence of two subscribing witnesses.

FERDINAND STRNAD.

Witnesses:
VIKTORIA STRNAD,
EMIL MÜLLER.